(12) United States Patent
Becker (10) Patent No.: US 9,195,700 B1
(45) Date of Patent: Nov. 24, 2015

(54) SYSTEMS AND METHODS FOR STORING TIME-SERIES DATA

(71) Applicant: United Services Automobile Association (USAA), San Antonio, TX (US)

(72) Inventor: Glen A. Becker, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/754,190

(22) Filed: Jan. 30, 2013

Related U.S. Application Data (63) Continuation of application No. 11/869,983, filed on Oct. 10, 2007, now abandoned.

(51) Int. Cl.
*G06F 17/30* (2006.01)

(52) U.S. Cl.
CPC .................. *G06F 17/30336* (2013.01)

(58) Field of Classification Search
CPC ............ G06F 17/30864; G06F 17/30867; G06F 17/30675; G06F 17/30882
USPC .................................. 707/752, 748
See application file for complete search history.

(56) References Cited

U.S. PATENT DOCUMENTS

| | | | |
|---|---|---|---|
| 3,931,612 A | 1/1976 | Stevens et al. | |
| 4,295,206 A * | 10/1981 | Cain et al. | 1/1 |
| 5,117,495 A | 5/1992 | Liu | |
| 5,121,493 A | 6/1992 | Ferguson | |
| 5,187,750 A * | 2/1993 | Behera | 382/140 |
| 5,640,561 A | 6/1997 | Satoh et al. | |
| 5,704,057 A | 12/1997 | Cho | |
| 5,826,261 A | 10/1998 | Spencer | |
| 6,138,114 A | 10/2000 | Horowitz | |
| 6,301,579 B1 | 10/2001 | Becker | |
| 6,397,166 B1 | 5/2002 | Leung et al. | |
| 6,574,377 B1 | 6/2003 | Cahill et al. | |
| 6,738,933 B2 * | 5/2004 | Fraenkel et al. | 714/47.2 |
| 7,130,864 B2 | 10/2006 | Lin et al. | |
| 7,171,340 B2 | 1/2007 | Brocklebank | |
| 7,191,183 B1 | 3/2007 | Goldstein | |
| 7,251,589 B1 | 7/2007 | Crowe et al. | |
| 7,539,677 B1 | 5/2009 | Wong et al. | |
| 7,603,300 B2 * | 10/2009 | Haffner et al. | 705/30 |
| 2003/0084065 A1 | 5/2003 | Lin et al. | |
| 2004/0215768 A1 * | 10/2004 | Oulu et al. | 709/224 |
| 2004/0260636 A1 * | 12/2004 | Marceau et al. | 705/35 |
| 2005/0027858 A1 | 2/2005 | Sloth et al. | |
| 2005/0137963 A1 * | 6/2005 | Ricketts et al. | 705/37 |
| 2005/0182589 A1 | 8/2005 | Smocha et al. | |
| 2005/0246359 A1 | 11/2005 | Robbins | |
| 2007/0033104 A1 | 2/2007 | Collins et al. | |
| 2007/0050620 A1 * | 3/2007 | Pham et al. | 713/165 |
| 2007/0260834 A1 * | 11/2007 | Kavuri et al. | 711/162 |
| 2008/0070667 A1 * | 3/2008 | Lutnick et al. | 463/16 |
| 2009/0228382 A1 | 9/2009 | Marceau et al. | |
| 2010/0191554 A1 * | 7/2010 | Singh et al. | 705/7 |

* cited by examiner

*Primary Examiner* — Cam-Y Truong
(74) *Attorney, Agent, or Firm* — Eric L. Sophir; Dentons US LLP (57) ABSTRACT

In various embodiments, a method for maintaining and analyzing a rolling history of performance data for a computer network is described. In one embodiment, one year's data is stored, sorted by object and date. New data is appended to the end of the file each day and an index by object is stored. Using this method, data for twelve full months can be provided in object order, and data for one partial month that was added daily in date order can also be provided.

18 Claims, 7 Drawing Sheets

SYSTEMS AND METHODS FOR STORING TIME-SERIES DATA

CROSS-REFERENCES

The present application is a Continuation of U.S. patent application Ser. No. 11/869,983, filed Oct. 10, 2007. The subject matter described in this application is related to subject matter disclosed in the following commonly assigned applications: U.S. patent application Ser. No. 11/870,009, filed Oct. 10, 2007; and U.S. patent application Ser. No. 11/870,024, filed Oct. 10, 2007." The contents of each of the above-referenced U.S. patent applications are herein incorporated by reference in their entirety.

COPYRIGHT NOTICE AND PERMISSION

A portion of the disclosure of this patent document may contain material subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007, USAA.

BACKGROUND

Many businesses and organizations use computing systems comprising servers that serve numerous client devices and services. Organizations that operate the computing systems typically collect and analyze various statistics related to resource performance and utilization. Examples of such statistics include disk space usage and processor utilization.

Typically, server performance data is compiled on a periodic basis such as once per day or week. Such data is then compiled and analyzed, and the daily statistics are stored and kept available for a period of time depending on the organization's policies. In many cases, a one-year rolling history of high-volume performance data is desired. Typically, each server provides large quantities of performance data on a daily basis. For a large organization with hundreds or thousands of servers, the compilation and computation of performance data can be computationally intensive. For example, in a typical organization, the window of time during when new daily data arrives and daily reports are due is typically short and requires a significant amount of computation during the window.

The reporting and analysis of this history data can comprise either selecting a particular data elements or range of elements, or reading the entire file by order of element. The raw input data received from servers is typically in unsorted form. When the data is sorted, data objects that are related or fall under the same category must be retrieved. However, the related data objects are typically stored as the objects are received, and the related objects are generally not in contiguous storage locations. Thus the disk drive readers must scan large storage areas to retrieve the various related data objects, further adding to the time required to compute the performance data.

Many companies desire to perform data retrieval and sorting on a regular basis. In a typical scenario, server performance programs must analyze and report data representing one year for performance data for each server. Furthermore, the company IT department's capacity planners must be able to quickly select data for a particular server. Thus, in a typical large company that may have as many as 2000 servers, there may not be sufficient time or computational resources to carry out this task in a timely manner.

A typical approach to this problem is to store the data in a file or database. Each day, new data is inserted into or appended to the end of the table. An index by object is maintained to allow a program to access or select the data by object. While this method may produce the desired result, read access is typically slow if one uses an index to read all objects of a very large table because the data for each object is widely scattered across the database. This method also requires a periodic purge to limit the data to the current rolling year. The result is that while write speeds are fast, read speeds are slow, and there must be an extra purge step. A variation to this approach is to keep each day's data physically separate. This removes the need for an extra purge step, but this variation makes reading the data even slower and requires more complex code to do so.

Another approach is to sort the new and old data together by object each day. This solution also requires that each index be rebuilt each day. As files grow, however, the time it takes to sort the data for each day's updates will grow and become unwieldy. While this method does have the advantage of not requiring a separate purge step and takes advantage of fast read speeds, the result is very slow. In many cases, very rapid update times are critical because users often want to use new data to obtain fresh analysis as soon as possible after the data is available.

The problems noted above are experienced in various applications beyond server performance data. Similar problems exist for situations where efficient storing and retrieval of data is desired, wherein the data is (1) organized as a collection of items, (2) periodic updates are provided for each item, (3) access to the history for at least one item is desired, and (4) the amount of data is of such a size that rapid updating and retrieval is important.

What are needed are systems and methods that address the shortcomings described above.

SUMMARY

In various embodiments of the present disclosure, a semi-sorted data store using a hybrid between the two methods above is described. By eliminating dependency on maintaining a sort order, many of the performance benefits of reading data in the order in which it is stored can still be maintained.

In one embodiment, one year's data is stored, sorted by object and date. New data is appended to the end of the file each day and an index by object is stored. Using this method, data for twelve full months can be provided in object order, and data for one partial month that was added daily in date order can also be provided. Daily updates can be completed quickly because the update requires only adding new data to the end of the file. Because most of the data is already in the correct order, read access is nearly as fast as if all of the data had been sorted. In many cases, such rapid update times are critical because users often want to use new data to obtain fresh analysis as soon as possible after the data is available.

While the method described can be used with a wide variety of data stores, in one embodiment it is optimized for use with SAS™, which is a common choice for storing performance data. Furthermore, the methods and systems disclosed herein may be applied to various scenarios involving the storing of time series data. Types of data that fit this description include, but are not limited to:

1. Measurements, such as daily rainfall measurements of various locations;

2. Customer activity data, whether "transactional" (one row per transaction), or periodic summaries thereof, that might be appended to the existing record of customer activity to produce a customer profile;
    3. Sales volumes of branch locations;
    4. Census data for city blocks;
    5. Airline flight data for certain flight numbers; and
    6. Voting patterns of certain geographic areas The methods and systems disclosed herein may be applied to any situation where a large amount of event or time-interval data must be maintained and users require access to the data history, in particular, where it would be impractical to manage the data for each object in a separate file or table.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION OF ILLUSTRATIVE EMBODIMENTS

Example Computing Devices and Environment

Figure 1:
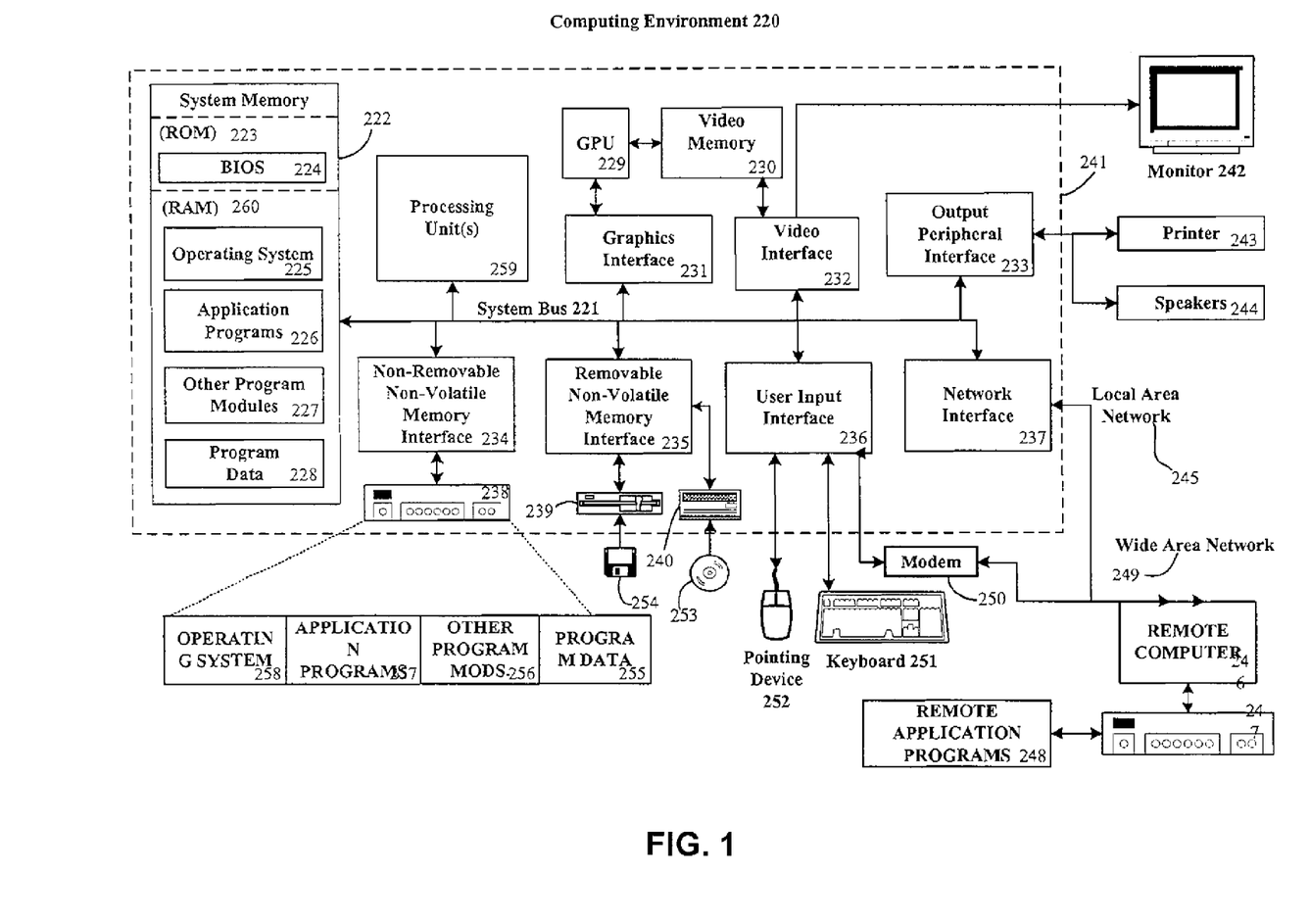
FIGS. 1 and 2 are diagrams illustrating example systems in which aspects of the described embodiments may be incorporated.

Referring to FIG. 1, shown is a block diagram representing an exemplary computing device suitable for use in conjunction with providing a system implementing a semi-sort strategy. For example, the computer executable instructions that carry out the processes and methods carrying out the methods described herein may reside and/or be executed in such a computing environment as shown in FIG. 1. The computing system environment 220 is only one example of a suitable computing environment and is not intended to suggest any limitation as to the scope of use or functionality of the disclosed technology. Neither should the computing environment 220 be interpreted as having any dependency or requirement relating to any one or combination of components illustrated in the exemplary operating environment 220.

Aspects of the disclosed technology are operational with numerous other general purpose or special purpose computing system environments or configurations. Examples of well-known computing systems, environments, and/or configurations that may be suitable for use with the disclosed technology include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the disclosed technology may be implemented in the general context of computer-executable instructions, such as program modules, being executed by a computer. Generally, program modules include routines, programs, objects, components, data structures, etc. that perform particular tasks or implement particular abstract data types. Aspects of the disclosed technology may also be practiced in distributed computing environments where tasks are performed by remote processing devices that are linked through a communications network. In a distributed computing environment, program modules may be located in both local and remote computer storage media including memory storage devices.

An exemplary system for implementing aspects of the disclosed technology includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard. In some embodiments, the exemplary system may additionally include a graphics interface 231 that renders graphics, video memory 230 that can be used to cache graphics, and a GPU 229 that executes the instructions to render graphics.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, long and short range radio frequency (RF), infrared, and other wireless media. Combinations of any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS) containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above, and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit 259 through a user input interface 236 coupled to the system bus, but may be connected by other interface and bus structures, such as a parallel port, game port, or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or use the processes described in connection with the disclosed technology, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language and may be combined with hardware implementations.

Although exemplary embodiments may refer to using aspects of the disclosure in the context of one or more stand-alone computer systems, the disclosure is not so limited, but rather may be implemented in connection with any computing environment, such as a network or distributed computing environment. Still further, aspects of the disclosure may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
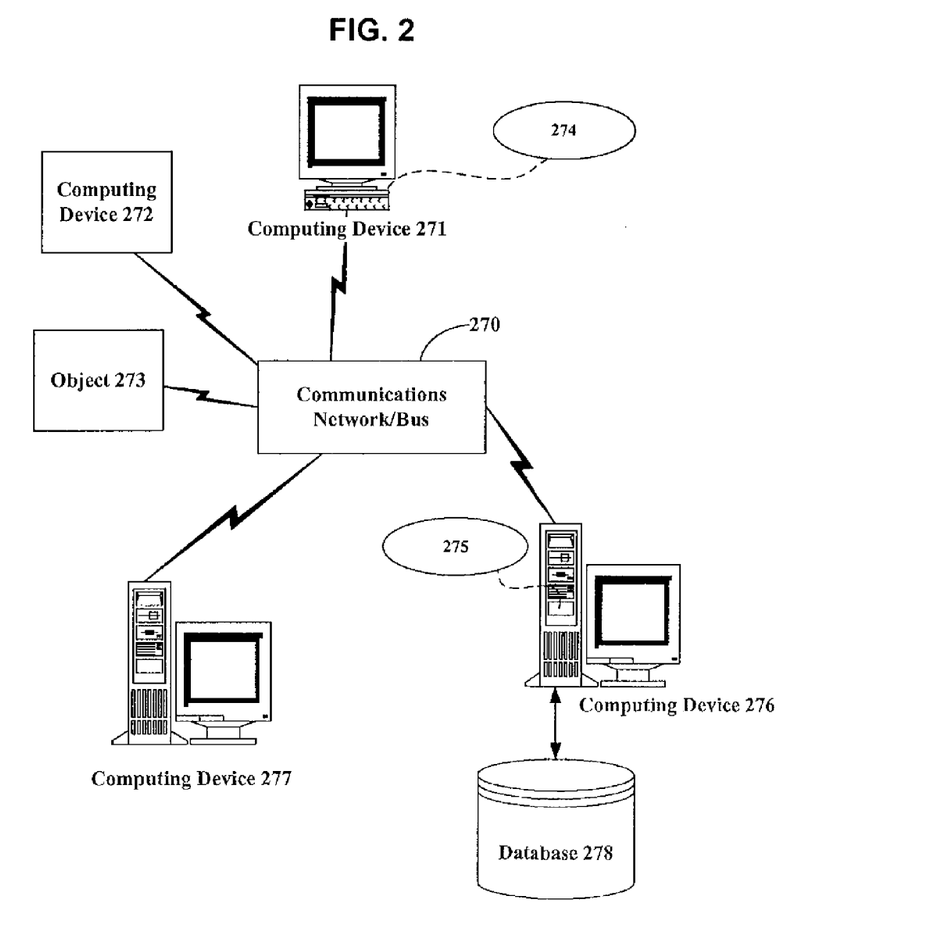

Referring next to FIG. 2, shown is an exemplary networked computing environment of which the methods and systems described herein may be a part of and in which many computerized processes may be implemented to provide the semi-sort strategy. For example, object 273 may represent a user requesting performance data as one of the various clients on the network of FIG. 2 using and/or implementing systems that provide the means of communication between various clients and servers on the network. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277, and 278 may comprise or make use of programs, batch processes, methods, data stores, programmable logic, etc. The entities 271, 272, 273, 274, 275, 276, 277, and 278 may span portions of the same or different devices such as PDAs, audio/video devices, music players, personal computers, etc. Each entity 271, 272, 273, 274, 275, 276, 277, and 278 can communicate with another entity 271, 272, 273, 274, 275, 276, 277, and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the disclosure, each entity 271, 272, 273, 274, 275, 276, 277, and 278 may contain discrete functional program modules that might make use of an API, or other object, software, firmware and/or hardware, to request services of one or more of the other entities 271, 272, 273, 274, 275, 276, 277, and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a user of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277, and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another using the functionality provided by protocol layer(s). For example, HyperText Transfer Protocol (HTTP) is a common protocol used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Figure 3:
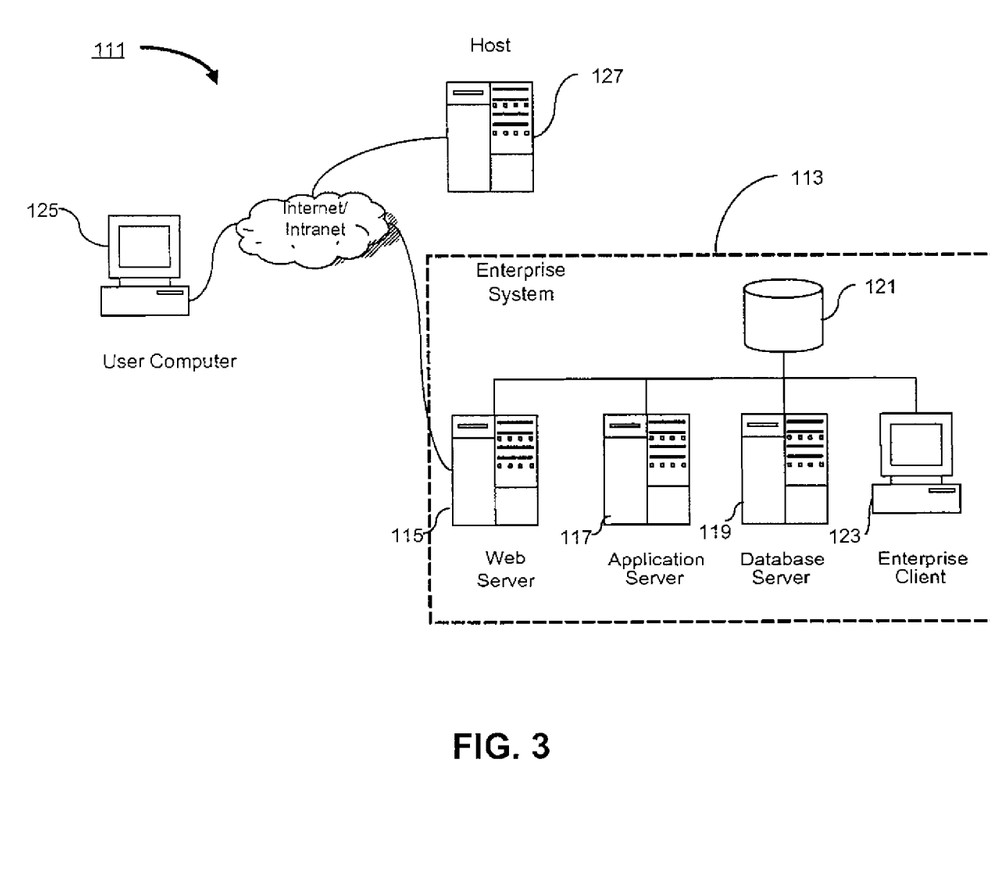
FIG. 3 illustrates a general environment in which the systems and methods described herein can be implemented.

Illustrated in FIG. 3 is a typical environment in which the systems and methods for sorting performance data may be implemented. The general system 111 is a client/server system implemented through the Internet or company intranet. An enterprise system 113 is provided which may include a Web server 115, an application server 117, and a database server 119 with an associated data store 121. Also included in the enterprise system may be a plurality of enterprise client computers 123, such as computers operated by customer service representatives. It should be noted that the enterprise system 113 may comprise a plurality of Web servers 115, application servers 117, and database servers 119, or all may be combined in a single computer device that provides the various functionalities of those servers. Access to the Web server 115 is provided to a plurality of user computers 125 through the Internet or company intranet.

In light of the diverse computing environments that may be built according to the general framework provided in FIGS. 1, 2 and 3 and the further diversification that can occur in computing in a network environment such as that of FIGS. 1, 2, and 3, the systems and methods provided herein cannot be construed as limited in any way to a particular computing architecture or operating system. Instead, the disclosure should not be limited to any single embodiment, but rather should be construed in breadth and scope in accordance with the appended claims.

Semi-Sort Strategy

A system administrator is a person employed to maintain and operate a computer system or network such as the systems described above. System administrators are typically members of an organization's information technology department. The duties of a system administrator are wide-ranging and vary widely from one organization to another. Administrators are usually charged with installing, supporting, and maintaining servers or other computer systems, and planning for and responding to service outages and other problems.

An organization's network also comprises storage arrays. Such arrays come in a number of sizes. For larger organizations, Network Attached Storage (NAS) may be used. NAS is not attached to a server or workstation, but rather exists as its own distinct entity on the network, which can be accessed by the various workstations and servers on the network. Another technology that can be used is Direct Attached Storage (DAS). These devices attach directly to a server, greatly expanding the capacity of the server and can be used to create NASs. Large organizations may also use Storage Area Networks (SANs), typically using Fibre Channel Protocol.

The storage described above is typically embodied in disk drives. The time required to read or write a given amount of data to one or more disks is highly dependent on the physical layout of the data. The read/write time is typically the fastest if the data is stored in a physically contiguous fashion on the disk. If the data is widely scattered, the amount of time needed to move the disk arm to the correct location and wait for the desired data to rotate under the read/write head can far exceed the amount of time needed to read or write the actual data. In this sense, a disk drive does not behave as a completely random access device, but behaves more like a sequential access device with a moderately fast mechanism to jump from one location to another.

It is important for the company's information technology (IT) personnel to monitor the computing system's health. Important areas of the network to monitor include hard drives (free/used space, utilization, I/O rate, response, errors), CPU (utilization, errors), memory (utilization, errors), network (utilization, errors), switch ports (utilization, errors).

A typical task for IT administrators is to compile and analyze server performance data. For example, CPU time is important to monitor because CPU is an expensive resource. Furthermore, wasting CPU severely limits the amount of other work that can run on the server.

Typically, server performance data is compiled on a periodic basis such as once per day or week. Such data is then compiled and analyzed, and the daily statistics are stored and kept available for a period of time depending on the organization's policies. In many cases a one-year rolling history of high-volume performance data is desired. Typically, each server provides large quantities of performance data on a daily basis. For a large organization with hundreds or thousands of servers, the compilation and computation of performance data can be one of its largest applications in terms of the amount of data that must be processed each day. For example, in a typical organization the window of time between which new daily data arrives and daily reports are due is typically short and requires a significant amount of computation during the window.

Any process that handles this type and volume of data may thus deal with a large existing history and the need to incorporate a smaller set of new data. The large history and new data should be combined such that the old and new data can be processed together. Furthermore, it is desirable that both the update and the retrieval be very fast. For retrieval, the application typically examines all of the data for a single object together, and repeat the process for some or all of the various objects as needed. In some cases the number of objects may number in the thousands. Thus the challenge is to provide a method for the update and retrieval such that both update and retrieval are provided quickly. Typical methods available today provide for fast updates or fast retrieval, but not both.

Many companies desire to perform data retrieval and sorting on a regular basis. In a typical scenario, server performance programs must analyze and report data representing one year for performance data for each server. Furthermore, the company IT department's capacity planners must be able to quickly select data for a particular server. As described above, the wide scattering of the data for each object causes an extreme read performance cost, especially if the entire table must be read in object order. Thus, in a typical large company that may have as many as 2000 servers, there may not be sufficient time or computational resources to carry out this task in a timely manner and the updated result may not be available when needed.

The problems noted above are experienced in various applications beyond server performance data. Similar problems exist for situations where efficient storing and retrieval of data is desired, wherein the data is (1) organized as a collection of items, (2) periodic updates are provided for each item, (3) access to the history for at least one item is desired, and (4) the amount of data is of such a size that rapid updating and retrieval is important.

The methods and systems disclosed herein may be applied to various scenarios involving the storing of time series data. Types of data that fit this description include, but are not limited to:

1. Measurements, such as daily rainfall measurements of various locations;
2. Customer activity data, whether "transactional" (one row per transaction), or periodic summaries thereof, that might be appended to the existing record of customer activity to produce a customer profile;
3. Sales volumes of branch locations;
4. Census data for city blocks;
5. Airline flight data for certain flight numbers; and
6. Voting patterns of certain geographic areas The methods and systems disclosed herein may be applied to any situation where event or time-interval data must be maintained and users require access to the data history.

Figure 4A:
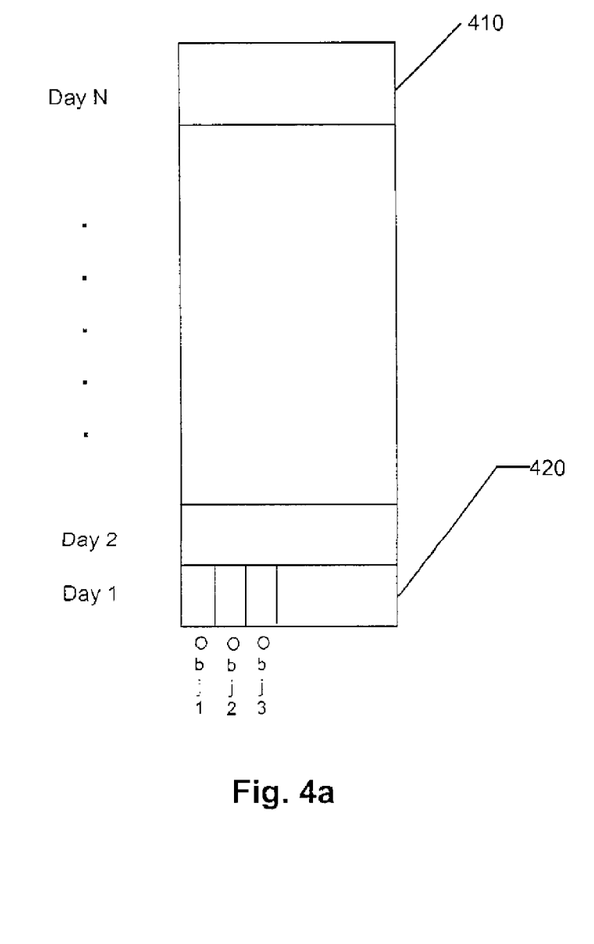
FIGS. 4a and 4b illustrate various data stores when maintaining sorted performance data without using a semi-sort method.
Figure 4B:
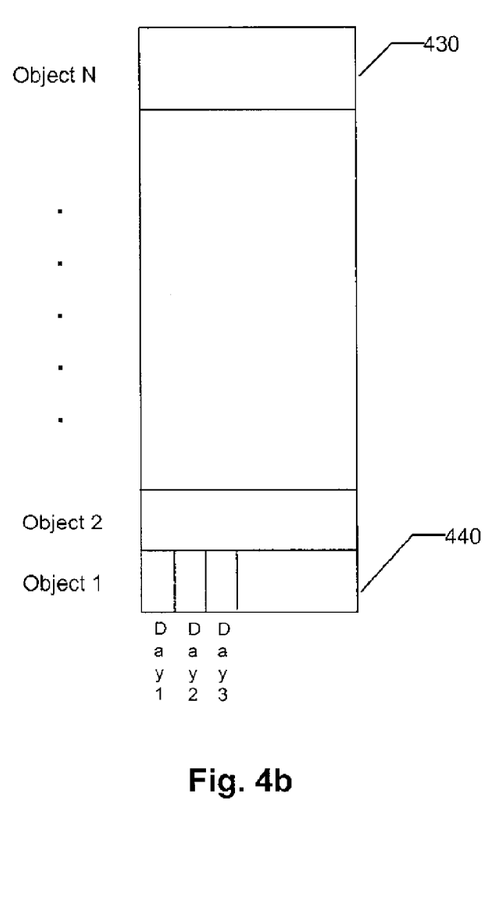

FIGS. 4a and 4b illustrate example solutions to providing a rolling history of performance data. A typical approach to this problem is to store the data in a file or database. Each day, new data is inserted into or appended to the end of the table. An index by object is maintained to allow a program to access or select the data by object. While this method may produce the desired result, read access is typically slow if one uses an index to read all objects of a very large table because the data for each object is widely scattered across the database. This method also requires a periodic purge to limit the data to the current rolling year. The result is that while write speeds are fast, read speeds are slow, and there must be an extra purge step.

Referring now to FIG. 4a, illustrated is an exemplary diagram wherein each day's data is stored physically separate and thus each day's data objects are accessible by date. For example, the data for day 1 will be appended to location 420. Similarly, the data for day N will be appended to location 410. This approach removes the need for an extra purge step as each day that falls outside of the desired rolling time window can simply be discarded. However, this approach still requires significant storage read times and typically requires more complex code to do so.

Referring to FIG. 4b, illustrated is another data organization approach wherein the new and old data are sorted together by object each day. Similar to the approach shown in FIG. 4a, this solution also requires that each index be rebuilt each day. For example, object 1 for each day of data will be stored together in location 440. Similarly, object N for each day will be stored together in location 430. As the number of files grows, however, the time it takes to sort the data for each day's updates will continuously grow and become unwieldy. This method has the advantage of not requiring a separate purge step because any data outside the desired rolling time window can be discarded during each re-sort. Furthermore, because the objects are sorted and stored together, the storage read speeds will typically be fast. However, this method requires a significant amount of processing and depending upon the amount of data, the desired results may not be readily available when data is requested.

In various embodiments of the present disclosure, a semi-sorted data store using a hybrid between the two methods above is described. By eliminating the dependency on maintaining a sort order, many of the performance benefits of reading data in the order in which it is stored can still be maintained.

Figure 5:
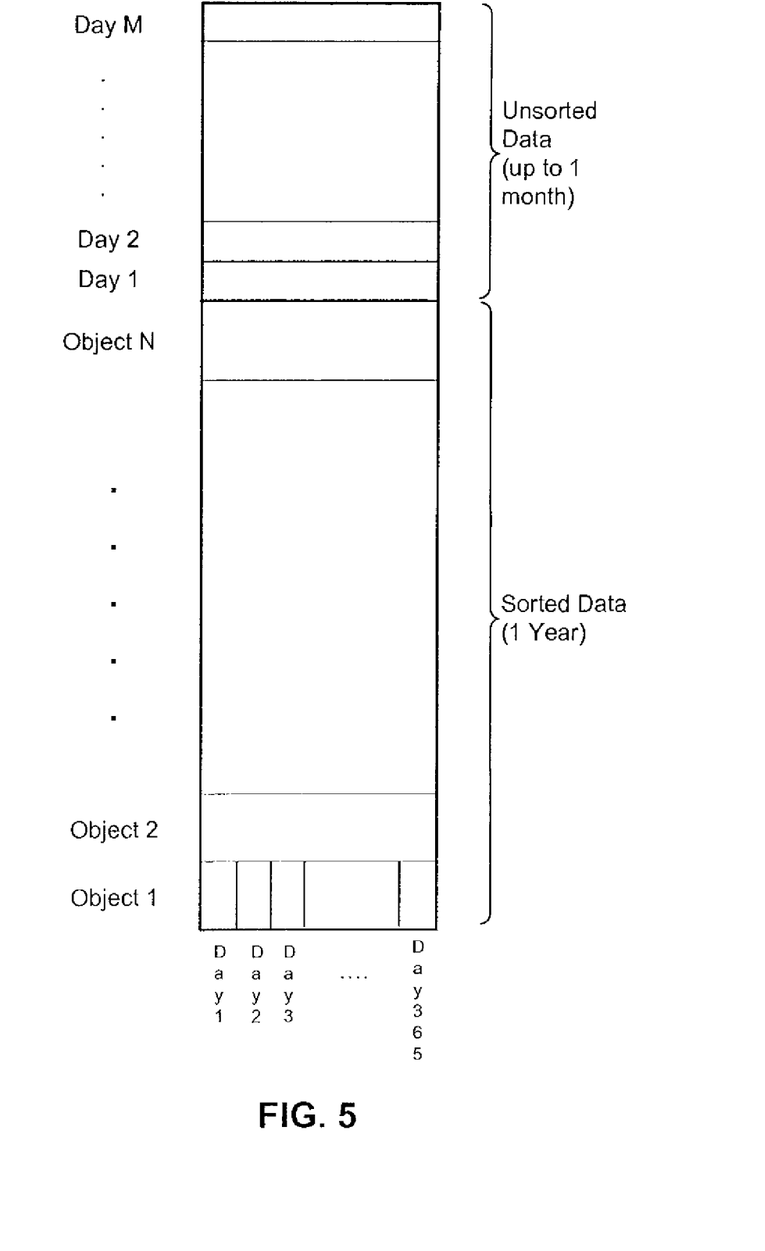
FIG. 5 illustrates a data store implementing the sorted performance data using a semi-sort method.

Referring to FIG. 5, illustrated is one embodiment in which one year's data is stored sorted by object and date. As each day's performance data is received, the new data is appended to the end of the file and an index by object is stored. New data will continue to be appended to the file in this manner up to a predetermined time period, typically one month. At the end of the period, a full sort by object and date can be performed at a convenient time. For example, the sort process can be performed over the weekend or other time when processing time is available and does not significantly affect other processes.

As shown in FIG. 5, sorted data can be maintained for twelve full months or any desired rolling time window. The sorted data can be provided in object order. The data for one partial month that was added daily in date order can also be provided. When requests for daily updates are received, the updates can be provided quickly because most of the data is already in object and date sorted order, thus allowing the data to be read much faster than using the approaches described in FIG. 4a.

Figure 6:
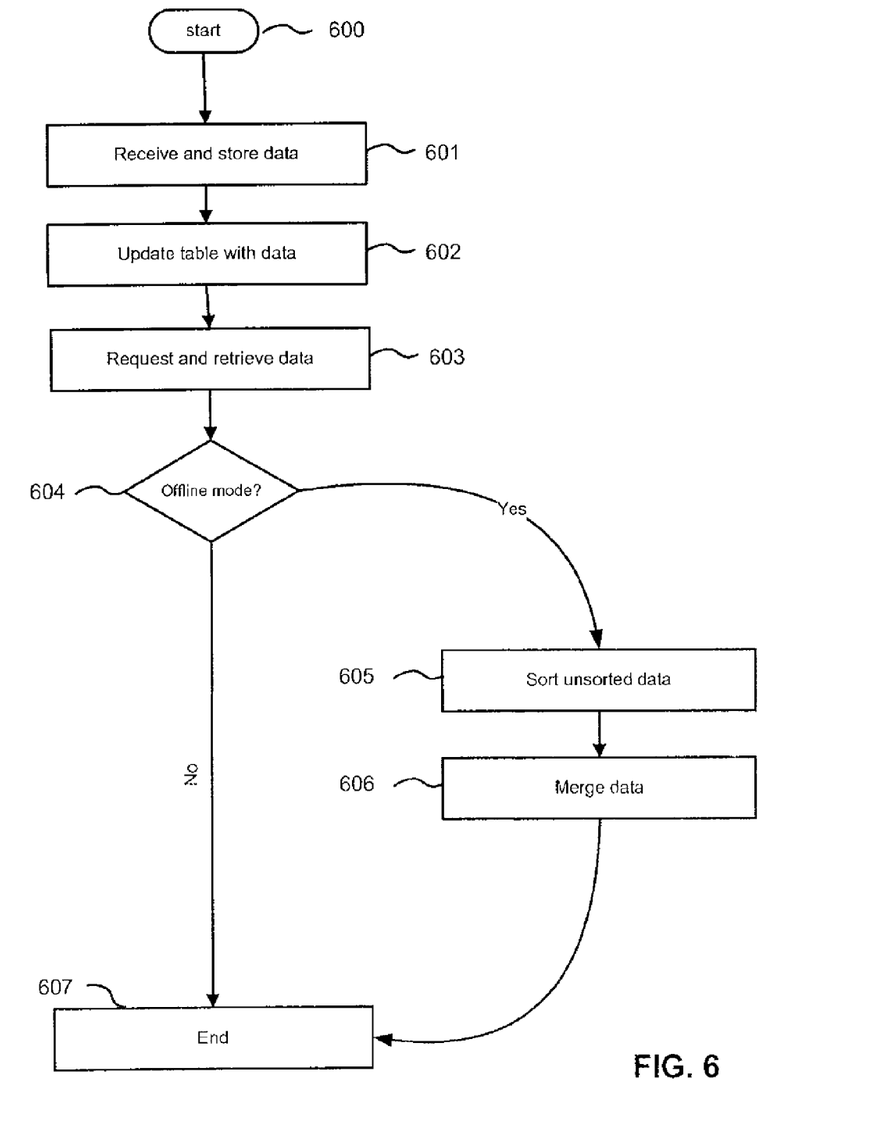
FIG. 6 is a flow diagram illustrating a method for maintaining sorted performance data using a semi-sort strategy.

FIG. 6 depicts a flow diagram illustrating an embodiment of the method described herein as applied to a network comprising a plurality of servers. Starting at block 600, the process receives and stores data 601 from a server, corresponding to at least one performance parameter for that server for a given time period such as a day. III block 602, the index table is updated with the location of the data. At this point, the data object has been added to the end of the file in the order that the object is sequentially received. In block 603, a user may request and receive data. Typically this data request occurs during the window between data availability and the requirement for complete reporting and/or analysis. In the example shown, blocks 601 and 602 should complete during the window, ensuring that the data is available for retrieval. In block 604. the process determines whether it is time for the offline periodic full sort of the data file. If so, then the process turns to block 605 in which any unsorted data objects in the data file are sorted according to the criteria designated by the process. Typically, the objects will be sorted according to the data object type or category and then sorted according to the time or date that the object was created or received. In block 606, the sorted data is merged or interleaved with the already sorted data in the database. As a result of the interleaving, any unwanted data (e.g., data outside the current history window) will be purged. New-data and the sorted-data are merged when processing resources are below a threshold value.

While the method described can be used with a wide variety of data stores, in one embodiment the method can be optimized for use with SAS™, which is a common choice for storing and analyzing performance data. A SAS™ dataset on Windows or Unix is physically a disk file, but is internally organized like a database table, with rows and columns. In the embodiments disclosed herein, in the SAS™ context a reference to a database that is sorted or indexed by object and date means that the database is organized by object, then by date within the object.

The following three cases further illustrate the methods described herein in the SAS™ context:

1. Unsorted: In the traditional database approach, new rows are inserted into or appended to the end of the data each day. Access by Object and Date requires use of the index. No assertions are made about its sort order, although in SAS™ the data is physically sorted by date and object. In a traditional database, if rows are deleted and then more rows are inserted, the physical order of the rows in the table becomes unpredictable.

2. Sorted: In the traditional sequential approach, the data is re-written in physical order by Object and Date. Rapid read access of a subset of objects requires the data be indexed by Object and Date. The maintenance physical order by Object and Date requires rebuilding and re-indexing the complete table each day.

3. Semi-Sorted: As described in the methods above, a semi-sort approach provides one year's data sorted and stored by Object and Date. New data is appended to the end of the file each day, and an index by Object is updated. Using this method, data for twelve full months is stored in Object order, and data for one partial month of daily additions in Date order is also stored. Daily updates can be completed quickly because the update just adds the new data to the end. The data can be retrieved quickly because most of the data is already in the desired order, thus allowing the data to be read much faster than using the approaches described above.

The above described semi-sort method discloses a straightforward embodiment, wherein all data is stored in a single physical data store (such as a database table), which is internally divided into a "sorted" and "unsorted" portion. It should be noted that the boundary between the sorted and unsorted portions is only conceptual. In another embodiment, the data may be stored in two different physical data stores. One store is a sorted portion containing most of the data (e.g., full year). A second stored is an unsorted portion containing the current month-to-date data. In this embodiment, in response to a request for data the system may provide a database view, presenting the two parts as if they were combined into one.

Figure 7:
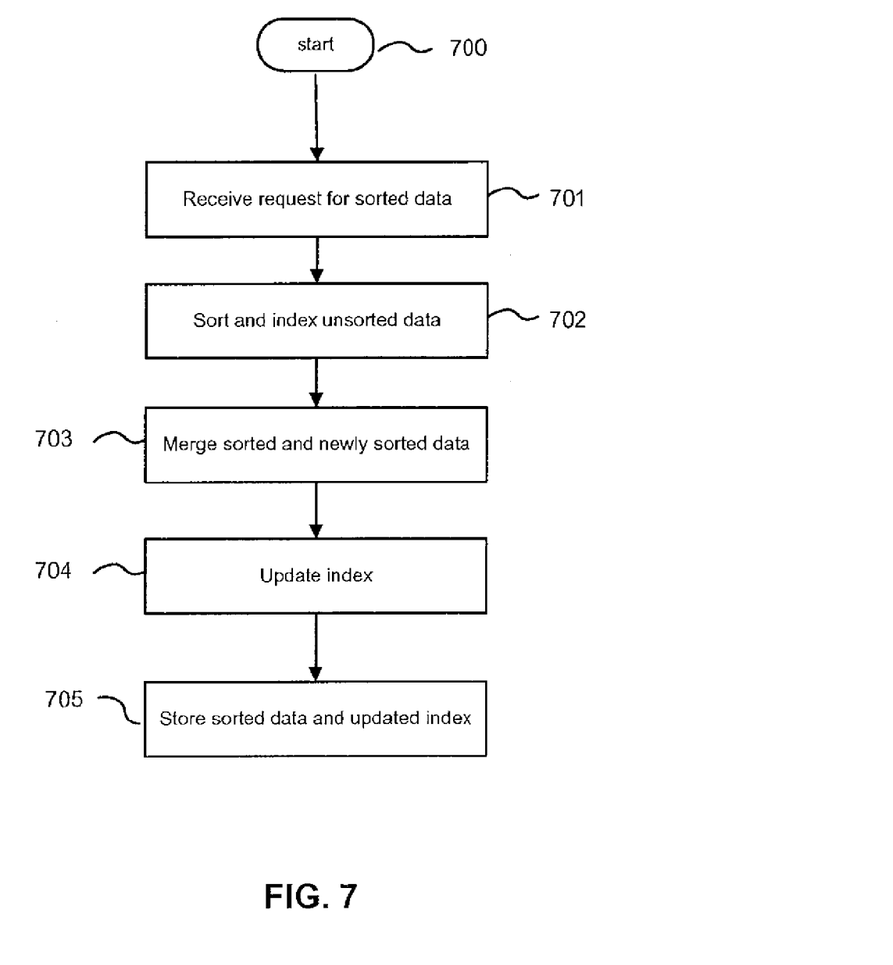
FIG. 7 is a flow diagram illustrating a method for merging sorted and unsorted performance data using a semi-sort strategy.

FIG. 7 depicts a flow diagram illustrating a further embodiment wherein sorted performance data from a network comprising a plurality of servers is merged with unsorted performance data. Starting at block 700, the process receives a request for sorted performance data 701 from a requesting process. Typically, an IT administrator or a configured process will have a need to determine a performance parameter a particular server or group of servers for a given time period such as a week or month. Up to this point, some data objects during the most current period are unsorted and the objects were stored in the database have been simply added to the end of the file in the order that the object is sequentially received. Other data during a rolling data window period has been previously sorted and indexed, but does not include the unsorted data from the most current period. In block 702, all the unsorted data objects in the data file are sorted according to at least one criteria designated by the requesting process. Typically, the objects will be sorted according to the data object type or category and then sorted according to the time or date that the object was created or received.

In block 703, the process merges the stored sorted performance data and newly sorted data. This block typically comprises grouping the data according to an object order and then a date order. The index is then updated 704 to reflect new locations of the data, and in block 705 the process can store the sorted data and index. This block typically includes physically storing the data according to object order and then in time order. The process can be performed on a periodic basis or upon request from an IT administrator.

Although the more detailed examples provided above relate to servers, it should be apparent to one of ordinary skill in the art that the systems and methods described herein will find application to other services that use time series data. Additionally, although references have been made to a limited number of data items that may be applied in an information technology environment, the systems and methods of the present disclosure may be applied in connection with a wide variety of data items relating to data and data management.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The various systems, methods, and techniques described herein may be implemented with hardware or software or, where appropriate, with a combination of both. Thus, the methods and apparatus of the present disclosure, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and combined with hardware implementations.

The methods of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the disclosure. When implemented on a general-purpose processor, the program code combines with the processor to provide a unique apparatus that operates to perform the functionality of the systems and methods described herein. Therefore, the present disclosure should not be limited to any single embodiment, but rather construed in breadth and scope in accordance with the appended claims.

What is claimed:

1. A system for merging data, the system comprising:
   a non-transitory machine-readable storage memory comprising a first set of memory locations and a second set of memory locations,
   the first set of memory locations of the memory storing sorted-data sequentially, the sorted-data being sorted according to one or more object types associated with the sorted-data and then sorted according to a time period of the sorted-data was received from one or more servers,
   the second set of memory locations of the memory storing new-data received from the one or more servers and appended sequentially to the first set of memory locations of the memory, the new-data sorted according to the time period of the new-data was received from the one or more servers and then according to the one or more object types associated with the new-data;
   an administrative computer comprising non-transitory machine-readable storage memory storing an index for the new-data, the index referencing the new-data according to the one or more object types associated with the new-data; and
   a processor configured to re-sort the new-data stored in the second set of memory locations into second sorted-data, the second sorted-data sorted according to the one or more object types associated with the new-data and then according to the time period when the new-data was received,
   wherein the processor is further configured to merge the second sorted-data of the second set of memory locations and the sorted-data in the first set of memory locations, thereby generating merged-data being sorted according to the time period of the merged-data was received and then according to the one or more object types associated with the merged-data, wherein the new-data and the sorted-data are merged when processing resources are below a threshold value, wherein the sorted-data corresponds to at least one server performance parameter regarding performance of at least one server computer.

2. The system of claim 1 wherein the time period is a day.

3. The system of claim 1 wherein the second set of memory locations containing the new-data is appended to the first set of memory locations every one month.

4. The system of claim 1, wherein the merged-data is stored in a combination of the first and second sets of memory locations for one year.

5. The system of claim 1, wherein the first set of memory locations is stored by Network Attached Storage.

6. The system of claim 1, wherein the first set of memory locations is stored by Direct Attached Storage.

7. The system of claim 1, wherein the first memory is stored by a Storage Area Network.

8. A method for merging data, the method comprising:
   storing sequentially, by a first set of memory locations of a non-transitory machine-readable storage memory, sorted-data in locations of the first set of memory locations, the sorted-data being sorted according to one or more object types associated with the sorted-data and then according to a time period of the sorted-data was received from one or more servers;

receiving, by a second set of memory locations of the non-transitory machine-readable storage memory, new-data from the one or more server computers, the new-data being appended sequentially to the memory locations of the first set of memory locations, the new-data sorted according to the time period of the new-data was received from the one or more servers and then according to the one or more object types associated with the new-data;

storing, by a second memory, an index for an object type associated with the new-data, the index referencing the new-data according to the one or more object types associated with the new-data;

re-sorting, by the second memory, the new-data into second sorted-data, the second sorted-data being sorted according to the object type associated with the new-data and the time period of the new-data was received from the one or more servers; and merging, by the first memory, the second sorted-data in the second set of memory locations and the sorted-data in the first set of memory locations, thereby generating merged-data sorted according to the time period of the merged-data was received and then according to the object type associated with the merged-data, wherein the new-data and the sorted-data are merged when processing resources are below a threshold value, wherein the sorted-data corresponds to at least one server performance parameter regarding performance of at least one server computer.

9. The method of claim 8 wherein the sorted-data is customer activity data.

10. The method of claim 8 wherein the sorted-data is sales data.

11. The method of claim 8 wherein the sorted-data corresponds to a plurality of measurements.

12. The method of claim 8 wherein the sorted-data corresponds to census data.

13. The method of claim 8 wherein the time period is greater than a day.

14. A non-volatile computer readable storage medium having instructions stored thereon that are executed by a processor to:

store sorted-data sequentially in a first set of memory locations of a non-transitory machine-readable storage memory, the sorted-data being sorted according to one or more object types associated with the sorted-data and then according to a time period of the sorted-data was received from one or more servers;

receive new-data from the one or more server computers, the new-data being appended sequentially to memory locations in a second set of memory locations of the non-transitory machine-readable storage memory, the new-data sorted according to the time period of the new-data was received from the one or more servers and then according to the one or more object types associated with the new-data;

store an index for the object type associated with the new-data, the index referencing the new-data according to the one or more object types associated with the new-data;

re-sort the new-data into second sorted-data, the second sorted data being sorted according to the time period of the new-data was received from the one or more servers and then according to the object type associated with the new-data; and merge the second sorted data in the second set of memory locations and the sorted-data in the first set of memory locations, thereby generating merged-data sorted according to the time period of the merged-data was received from the one or more servers, and then according to the object type associated with the merged-data, wherein the new-data and the sorted-data are merged when processing resources are below a threshold value, wherein the sorted-data corresponds to at least one server performance parameter regarding performance of at least one server computer.

15. The non-volatile computer readable storage medium of claim 14 wherein the time period is less than a day.

16. The non-volatile computer readable storage medium of claim 14 wherein the sorted-data being sorted by the time period are sorted by date.

17. The non-volatile computer readable storage medium of claim 14 wherein the new-data being appended sequentially to the file is indexed.

18. The non-volatile computer readable storage medium of claim 17 wherein the index is accessed for retrieval of the new-data.

* * * * *